(No Model.)
M. WHEELER.
MOUNTING TERRESTRIAL GLOBES.
No. 438,126. Patented Oct. 7, 1890.
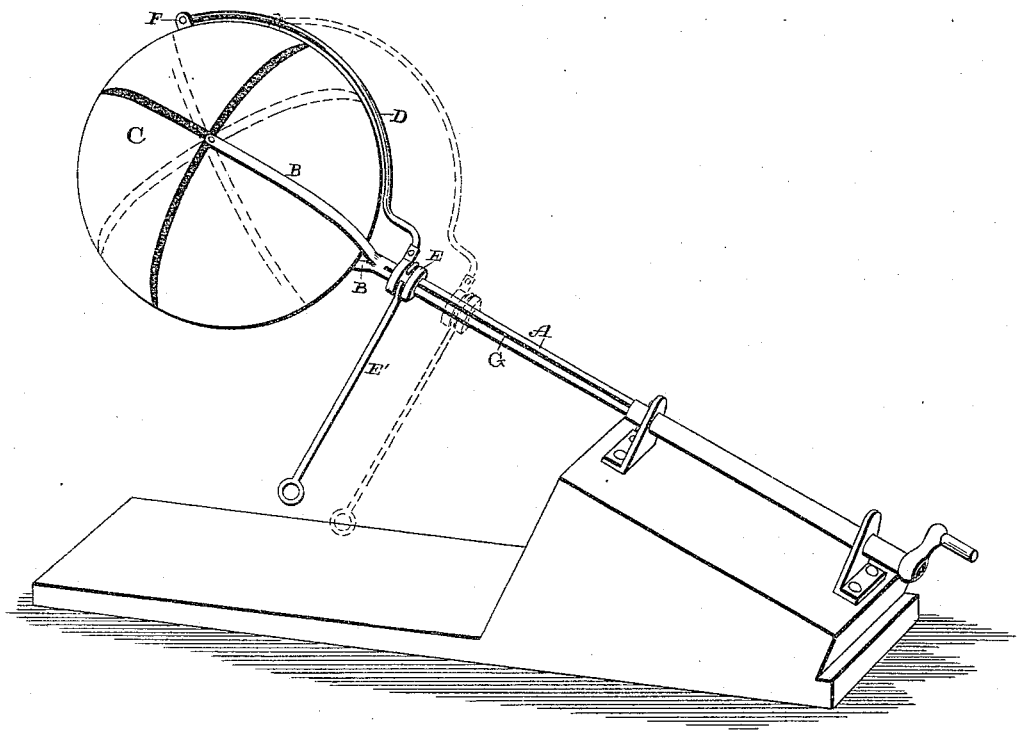
Witnesses:
E. P. Ellis,
J. M. Nesbit
Inventor:
M. Wheeler
per J. A. Lehmann, atty

UNITED STATES PATENT OFFICE.

MARSHAL WHEELER, OF SAN FRANCISCO, CALIFORNIA.

MOUNTING TERRESTRIAL GLOBES.

SPECIFICATION forming part of Letters Patent No. 438,126, dated October 7, 1890.

Application filed May 6, 1890. Serial No. 350,739. (No model.)

*To all whom it may concern:*

Be it known that I, MARSHAL WHEELER, of San Francisco, in the county of San Francisco and State of California, have invented certain new and useful Improvements in Mounting Terrestrial Globes; and I do hereby declare the following to be a full, clear, and exact description of the invention, such as will enable others skilled in the art to which it pertains to make and use it, reference being had to the accompanying drawing, which forms part of this specification.

My invention relates to an improvement in mounting terrestrial globes; and it consists in the combination and arrangement of parts which will be fully described hereinafter.

The object of my invention is to produce two motions in a revolving globe, one from west to east as the earth revolves, and a partial one from north to south, or vice versa, while said globe is revolved in the primary direction from west to east, the two motions being reversible at will.

The accompanying drawing represents a perspective of a globe which embodies my invention, the parts being shown in different positions in dotted lines.

A represents a grooved rod or shaft, which forms a support for the globe, and which is provided with a crank at one end and the curved prongs B at the other. This rod or shaft is journaled in any suitable bearings prepared for it, and which may either be of the construction which is here shown, or any other that may be preferred. In this rod is made a longitudinal groove G of any suitable length.

Journaled, pivoted, or mounted between the prongs is the globe C, which, as the shaft A is made to revolve in its bearings by the crank upon its outer end, revolves with the shaft, and thus represents the motion of the earth from west to east. Secured to this globe at any suitable point is a projection F, and pivoted to this projection is a curved rod D, which has its other end pivoted to the sleeve or collar E, placed upon the revolving rod or shaft A. In order to cause this collar to revolve with the shaft A, it is provided with a projection which catches in the groove. Loosely attached to this collar is a handle E', of any suitable construction, and by means of which the sleeve or collar is moved back and forth upon the shaft. As this collar or sleeve is moved back and forth, the rod D is made to cause the globe C to turn upon its pivot at right angles to its movement from left to right, and thus illustrate a third movement, which the earth has and which takes place at long intervals of time.

The shaft A is preferably placed at the angle here shown, and journaled upon a supporting-base of the shape here shown, though it will readily be understood that I do not desire to limit myself to that construction.

While I here show a collar E sliding upon the shaft A, and to which the outer end of the rod D is fastened, it will be seen that this collar may be dispensed with and the globe turned upon its axis by the rod D direct, without any other connections. So, also, while I show the rod A bifurcated at its outer end this construction is not absolutely necessary, for it will be readily understood that the axis of the globe may be secured at one end only, in which instance one of the prongs would be omitted.

At the same time that the shaft is being revolved so as to illustrate the movement of the earth from west to east the sleeve or collar is slowly moved upon the rod or shaft, so as to turn the globe upon its axis one quarter around, and thus illustrate the reversal of the poles, which takes place once in every twenty thousand nine hundred and three years, at a time when, owing to the revolution of the line of the apsides, the earth is in perihelion at the time of the autumnal equinox. This time is known as the "astronomer's great year." It occured last in the year 3958 B. C., and it occurs next in the year A. D. 16945, or fifteen thousand and fifty-five years hence.

Having thus described my invention, I claim—

1. In a mounting for a globe, the combination, with a support, of a shaft journaled thereon at one end, a globe journaled upon the opposite end of the shaft upon an axis at an angle to the shaft, and a rod pivotally connected to the surface of the globe for revolving it in a plane at an angle to the axis of the said shaft, substantially as shown and described.

2. The combination of a grooved revolving support, a globe pivoted thereon at an angle to the bearings of the shaft, a rod loosely connected to the globe, and a sliding collar placed upon a revolving support and to which the end of said rod is fastened, substantially as described.

In testimony whereof I affix my signature in presence of two witnesses.

MARSHAL WHEELER.

Witnesses:
   JNO. R. HILLMAN,
   R. D. MCELROY.